US008668780B2

(12) United States Patent
English et al.

(10) Patent No.: US 8,668,780 B2
(45) Date of Patent: Mar. 11, 2014

(54) CONTACT LENS CARRIER AND METHODS OF USE THEREOF IN THE MANUFACTURE OF OPHTHALMIC LENSES

(75) Inventors: Stephen English, Southampton (GB); Kevin Aldridge, Southampton (GB)

(73) Assignee: Coopervision International Holding Company, LP, St. Michael (BB)

(*) Notice: Subject to any disclaimer, the term of this patent is extended or adjusted under 35 U.S.C. 154(b) by 654 days.

(21) Appl. No.: 12/957,605

(22) Filed: Dec. 1, 2010

(65) Prior Publication Data
US 2012/0138488 A1 Jun. 7, 2012

(51) Int. Cl.
*B08B 3/04* (2006.01)
(52) U.S. Cl.
USPC ............................. 134/25.4; 134/42

(58) Field of Classification Search
None
See application file for complete search history.

(56) References Cited

U.S. PATENT DOCUMENTS

| | | | | |
|---|---|---|---|---|
| 5,476,111 A | * | 12/1995 | Andersen et al. | 134/58 R |
| 7,652,756 B2 | | 1/2010 | Suppel-Adrian et al. | |
| 2009/0264553 A1 | * | 10/2009 | Chen et al. | 523/107 |

* cited by examiner

*Primary Examiner* — Nicole Blan
(74) *Attorney, Agent, or Firm* — Klein, O'Neill & Singh, LLP (57) ABSTRACT

Methods, devices, and systems for manufacturing ophthalmic lenses are described in which lens bodies are placed in cavities of lens carriers that are fluidly connected to reservoirs, flow ducts and sub-cavity base channels that provide enhanced washing and wet processing of the lenses.

11 Claims, 6 Drawing Sheets

CONTACT LENS CARRIER AND METHODS OF USE THEREOF IN THE MANUFACTURE OF OPHTHALMIC LENSES

FIELD

Methods, devices, and systems for washing lens bodies in the manufacture of ophthalmic lenses are described.

BACKGROUND

During the manufacture of ophthalmic lenses, including contact lenses, such as hydrogel contact lenses and silicone hydrogel contact lenses, a polymerizable lens-forming composition containing reactive ingredients is polymerized to form polymerized lenses. The polymerized lenses can be washed to remove dust or debris from the manufacturing process, to remove un-crosslinked or partially crosslinked materials from the polymerized lenses, to hydrate the lenses, and combinations thereof, to produce washed polymerized lenses. Washing steps can include contacting the polymerized lenses with volatile alcohol or other organic solvent, contacting the polymerized lenses with aqueous liquids that may or may not contain a volatile alcohol or other organic solvents, solutes, or combinations thereof. The washed polymerized lenses ultimately are provided in packages, such as blister packages, which are subsequently sealed with sealing elements and sterilized. In some processes, the washing is performed in the package, and in other processes, the washing is performed with polymerized lenses located in washing trays or carriers. Additional steps may include inspecting the lenses for defects prior to sealing the package.

When polymerized lenses are washed in washing trays or lens carriers, the lenses must be separately transferred to the lens packages so that one lens is placed in one package. Although these steps can be performed manually, in a commercial manufacturing process, many steps are automated.

SUMMARY

New methods, devices, and systems for producing ophthalmic lenses are described. The present methods, devices, and systems are useful in temporarily storing ophthalmic lenses in lens carriers, and are also useful for holding lenses during washing steps, such as cleaning, extraction and hydration steps. With the present methods, devices, and systems, it is possible to improve the yield of a batch of lenses produced. An example, with the present lens carriers, a wet lens remains centered in a cavity of the carrier, which is useful in ensuring that the lens is accurately picked up by a wet lens pick up head and the number of missed wet lenses is reduced, compared to methods, devices, and systems in which different carriers are utilized. In addition, the yield can be improved by reducing damage to the wet lens resulting from the wet lens pick up head contacting and moving the wet lens. The yield can also be improved by reducing damage to the wet lens resulting from the process of adding or removing fluid directly from a cavity when the wet lens is present in the cavity, as the fluid can be added or removed from a reservoir in fluid communication with the cavity, eliminating or minimizing the potential for the device adding or removing the fluid to contact and damage the wet lens.

With the present methods, devices, and systems, it is possible to improve the yield of a batch of lenses produced by providing improved washing with fluid flow flowing across and below the lenses. This minimizes the possibility of pressing an ophthalmic lens against a base surface of a cavity due to the incoming body of fluids.

With the present methods, devices, and systems, it is possible to improve lens production efficiency by using fewer wash cycles. For example, washing a lens located inside a cavity with not only fluids located in the cavity but with fluids located in a reservoir and flow channels that are all in fluid communication with the cavity increases the overall volume capacity for washing the ophthalmic lens. This in turn provides a greater volume for washing by dilution and provides a greater amount of fluid for extracting, hydrating, or cleaning the ophthalmic lens.

Another embodiment discussed herein is directed to a method of manufacturing ophthalmic lenses. In one example, the method of manufacturing an ophthalmic lens, comprises providing an ophthalmic lens in a cavity of a lens carrier; the lens carrier having a top, a bottom, and a perimeter; adding washing fluid into a reservoir that is remote from the cavity; and filling the cavity with the washing fluid from the reservoir by flowing the washing fluid across a flow duct, which connects to both the cavity and the reservoir.

Another embodiment is directed to a lens carrier. In one example, the lens carrier is an ophthalmic lens carrier useful in the manufacture of an ophthalmic lens, wherein the lens carrier comprises a body member having a substantially planar upper surface; a plurality of cavities depending from the substantially planar upper surface, each cavity including a sidewall portion and a base surface in contact with the sidewall portion and sized to accommodate an ophthalmic lens and a volume of fluid; and at least one reservoir depending from the substantially planar upper surface, the at least one reservoir connecting to at least one cavity by way of an at least one flow duct.

Yet another embodiment is directed to a system useful in the manufacture of an ophthalmic lens. In one example, the system comprises a lens carrier comprising a plurality of flow ducts, a plurality of cavities and at least one reservoir; wherein each flow duct connects to at least one cavity and the at least one reservoir so that the connected flow duct, at least one cavity, and at least one reservoir are in fluid communication with one another; a plurality of ophthalmic lenses each located in a respective cavity; and a pick and place robot for picking up the plurality of ophthalmic lenses.

The methods of manufacturing ophthalmic lenses, the lens carriers, and the systems useful in the manufacture of ophthalmic lenses can be used in conjunction with silicone hydrogel contact lenses, including silicone hydrogel contact lenses which are demolded and delensed without the use of a liquid, which are washed, extracted and hydrated without the use of a volatile alcohol or other organic solvent, or both.

Additional details of the embodiments and examples are also described by the following detailed description, drawings, and appended claims.

Various embodiments are described in detail in the detailed description and claims below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention.

DETAILED DESCRIPTION

The following disclosure is directed to methods, devices, and systems for manufacturing ophthalmic lenses. More particularly, the present methods, devices and systems are directed to lens carriers for holding lens bodies during washing steps. As used herein, a lens body refers to a lens that undergoes one or more washing steps in a manufacturing process, and an ophthalmic lens refers to a washed lens that is ready for packaging. The present methods, devices, and systems can be used to manufacture lenses formed from cast molding, lenses formed from lathing, lenses formed from spin casting, corneal onlay lenses, corneal inlay lenses, intraocular lenses, and other types of ophthalmic lenses. In certain examples, the ophthalmic lenses are hydrogel lenses, including silicone hydrogel lenses, and non-silicone hydrogel (e.g. polyHEMA or HEMA-based) contact lenses. Examples of silicone hydrogel contact lenses that can be used with the present methods, devices, and systems include, but are not limited to, silicone hydrogel contact lenses having the following U.S. Adopted Names (USANs): lotrafilcon A, lotrafilcon B, balafilcon A, galyfilcon A, senofilcon A, comfilcon A, and enfilcon A. A non-silicone hydrogel contact lens is a hydrogel contact lens that is free of a silicone component. Examples of non-silicone hydrogel contact lenses that can be used with the present methods, devices, and systems include hydrogel contact lenses having the following USANs: omafilcon A, ocufilcon A, ocufilcon B, ocufilcon C, ocufilcon D, ocufilcon E, etafilcon A, methafilcon A, and methafilcon B, among others.

In a cast molded contact lens manufacturing procedure, a polymerizable lens precursor composition, such as a monomer mixture and the like, is first placed in contact with a contact lens mold member. For example, the polymerizable lens precursor composition can be placed on a concave surface of a first mold member. The concave surface of the first mold member defines an anterior surface of a lens body obtained therefrom. A second mold member is then placed in mating contact with the first mold member to form a lens shaped cavity containing the precursor composition. The second mold member includes a convex surface that defines a posterior lens surface of a lens body obtained therefrom. The second mold member can be understood to be a male mold member and the first mold member can be understood to be a female mold member. As used herein, the combination of the first mold member and the second mold member can be understood to be a contact lens mold assembly.

The contact lens mold assembly containing the polymerizable lens precursor composition is then exposed to conditions effective in curing or polymerizing the polymerizable lens precursor composition. After the curing or polymerization step, a contact lens body is formed in the contact lens shaped cavity. The contact lens mold assembly is then demolded to separate the first and second mold members from one another. Demolding can be performed using a dry demolding step not involving a liquid or a wet demolding step that involves exposing the mold assembly including the lens to a liquid that assists in separating the first and second mold member. In the demolding process, the contact lens body typically remains attached to or in contact with one of the mold members, necessitating a delensing step in which the lens body is removed from the mold member. Delensing can be performed using a dry delensing step not involving a liquid or a wet delensing step that involves exposing the lens to a liquid that assists in separating the lens from the mold member to which it is attached or with which it contacts.

After demolding and delensing, and optionally one or more subsequent processing steps, the demolded lens body is placed in a cavity of a lens carrier for washing and optionally other processing steps. A robot or other automatic means may be used to place the lens body into the cavity. Alternatively, the lens body may be manually placed into the cavity. In some cases, the lens body may be placed in the cavity by virtue of the delensing occurring within the cavity. Typically the lens body is placed in the cavity with the posterior lens surface (i.e. base curve) facing the opening of the cavity. The cavity may be pre-dosed with washing fluid prior to placement of the lens body in the cavity, or the lens body may be placed in a dry cavity. As used herein, washing refers to any process in which the lens body is contacted with a liquid prior to placement in a packaging solution. Washing fluids may include, but are not limited to, water, organic solvents including one or more volatile alcohols, aqueous solutions containing one or more organic solvents (usually in amounts less than 50% by volume), aqueous saline solutions, aqueous buffer solutions, surfactant solutions, wetting agent solutions (e.g. solutions of one or more water soluble polymers, such as cellulosic polymers; such as hydroxyethylcellulose, hydroxymethylcellulose, methylcellulose, and carboxymethylcellulose; polylactam polymers, such as polyvinyl pyrrolidone; polyamide polymers, such as polyvinylmethyl acetamide; and polyvinyl alcohol polymers), and combinations thereof. Washing fluids may be used to clean a lens body, for example by removing dust or debris from the surface of the lens body, to extract the lens body by removing unreacted or partially reacted components from the polymerizable lens precursor composition, or to hydrate the lens bodies, or combinations thereof. As used herein, a lens body in an unhydrated state refers to a lens body without any water content and is dry. A lens in a fully hydrated state refers to a lens having a water content at an equilibrium state. A lens in a partially hydrated state refers to a lens having a water content between the unhydrated state and the fully hydrated state. As an example, silicone hydrogel contact lenses may be fully hydrated when they have an equilibrium water content from about 20% to about 70%, such as about 20%, about 30%, about 40%, about 50%, about 60%, or about 70%, or any value therebetween. Thus, the lens carrier is understood to be capable of holding pre-washed lens bodies (i.e. dry lenses), cleaned lens bodies, extracted lens bodies, partially hydrated lens bodies, or fully hydrated lens bodies.

Figure 1:
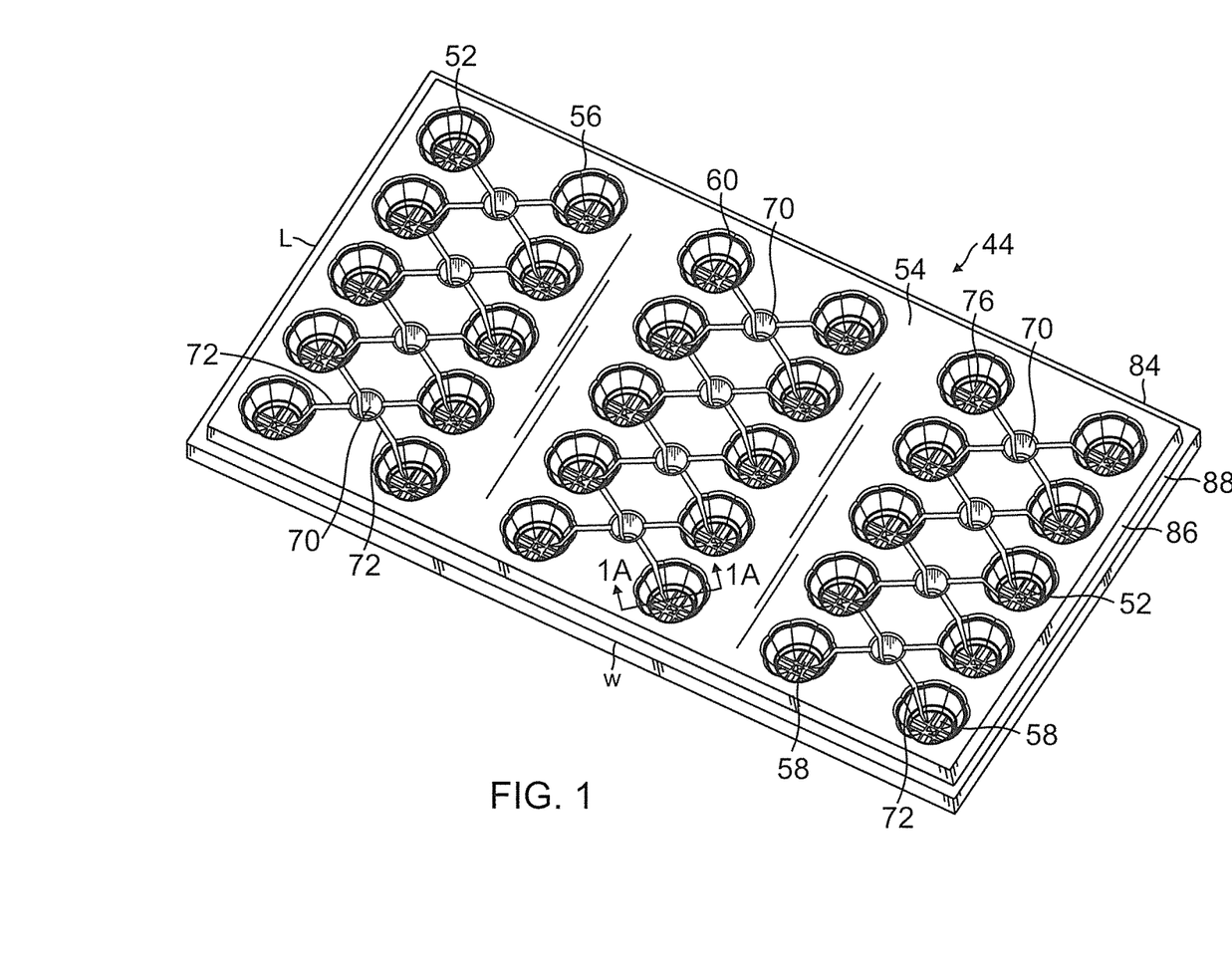
FIG. 1 is a perspective view of a lens carrier usable for wet processing contact lenses.

With reference to FIG. 1, a perspective view of a lens carrier 44 provided in accordance with one example is shown. The carrier 44 may be formed from a thermoplastic material, such as polypropylene, polystyrene, or other thermoplastic materials using conventional thermoforming, injection molding, or other conventional processing methods. In a specific example, the lens carrier is made using ATOFINA® polypropylene (Total Petrochemicals, Courbevoie, France).

The lens carrier 44 comprises a substantially planar upper surface 54 with at least one cavity 52, and typically a plurality of cavities, depending therefrom. Each cavity 52 is sized to receive a lens body and a volume of washing fluid, and may embody any suitable shape for retaining the lens body during washing. For example, the cavity may be substantially cylindrical, with circular or polygonal side-walls. Exemplary dimensions for the cavity include a base surface diameter (i.e., the diameter of the base surface or bottom surface of the cavity) that is slightly greater than the diameter of the lens body when fully hydrated. Typically a cavity has a base surface diameter of about 15-30 mm. The cavity typically has a height of about 10-25 mm, typically about 12-20 mm. The cavity 52 has an opening 56 defined by a perimeter having any suitable configuration for receiving a lens body. The cavity may be tapered, having an opening diameter that is larger than the diameter of the base surface, resulting in greater cavity volume than a substantially cylindrical cavity with the same base surface diameter. Typically the volume of the cavity is sufficient to retain at least 2 ml, 3 ml, 4 ml, or 5 ml of a washing fluid, and can retain greater than about 6 ml, such as 7 ml, 8 ml, 9 ml, or 10 ml, excluding volume attributed to the flow duct(s) and reservoir(s) detailed below. As shown in the illustrated lens carrier 44, the cavity base surface is solid, that is, the cavity base surface is free of through holes that would permit fluid to pass from the cavity through the base surface and out of the lens carrier 44.

Figure 1A:
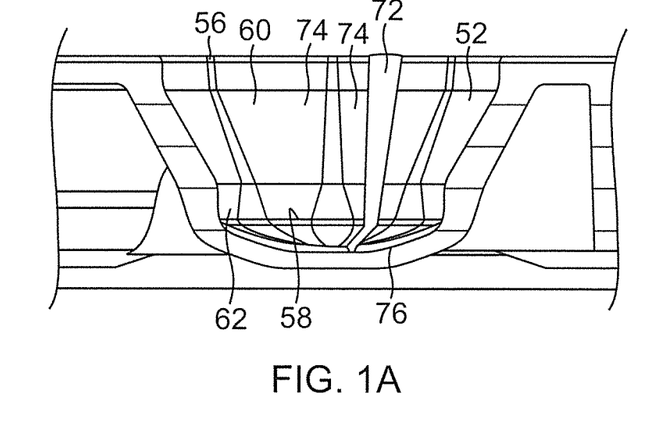
FIG. 1A is a cross-sectional side view of a cavity of the lens carrier of FIG. 1 taken along line 1A-1A.
Figure 2:
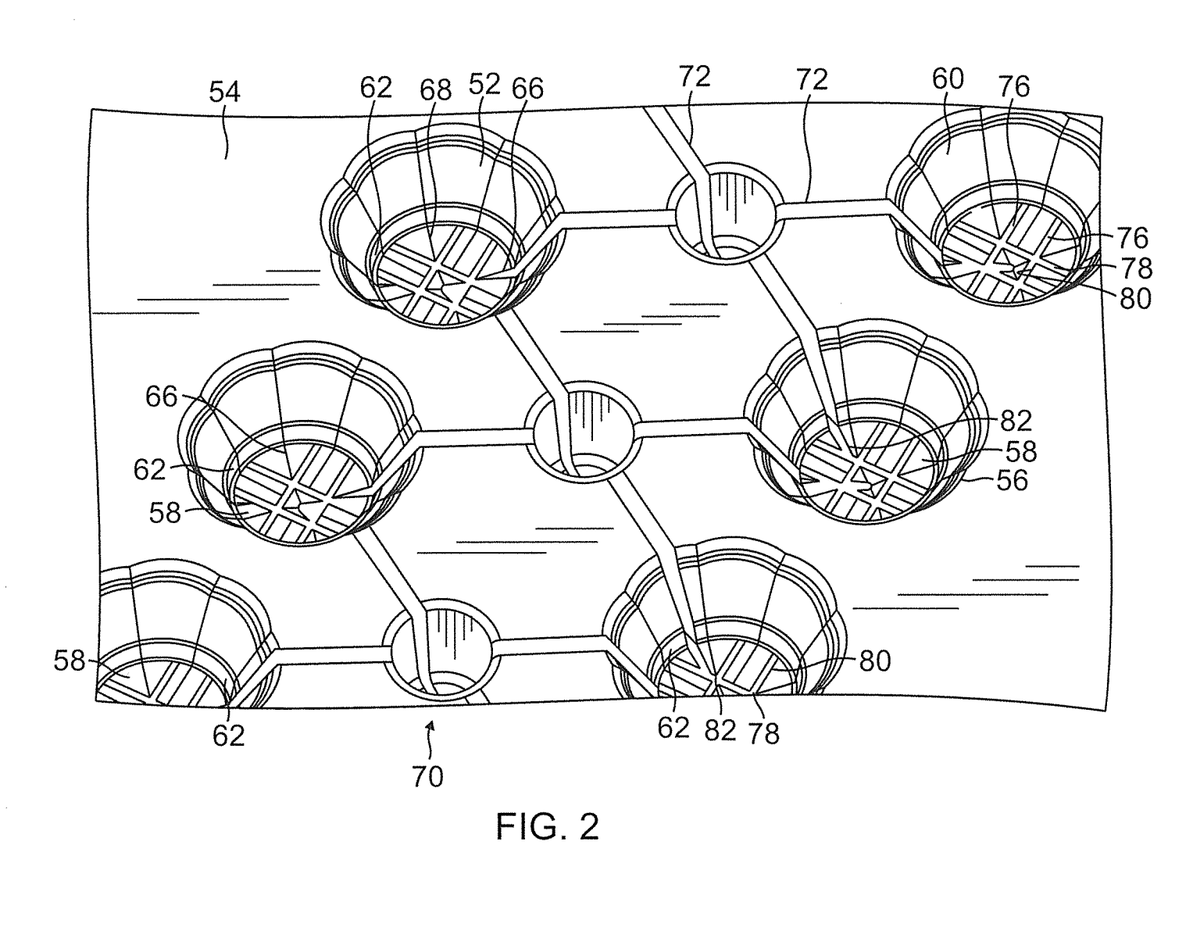
FIG. 2 is a partial blown up perspective view of the lens carrier of FIG. 1 showing details of the interior of storage cavities, reservoirs, and flow ducts.
Figure 3:
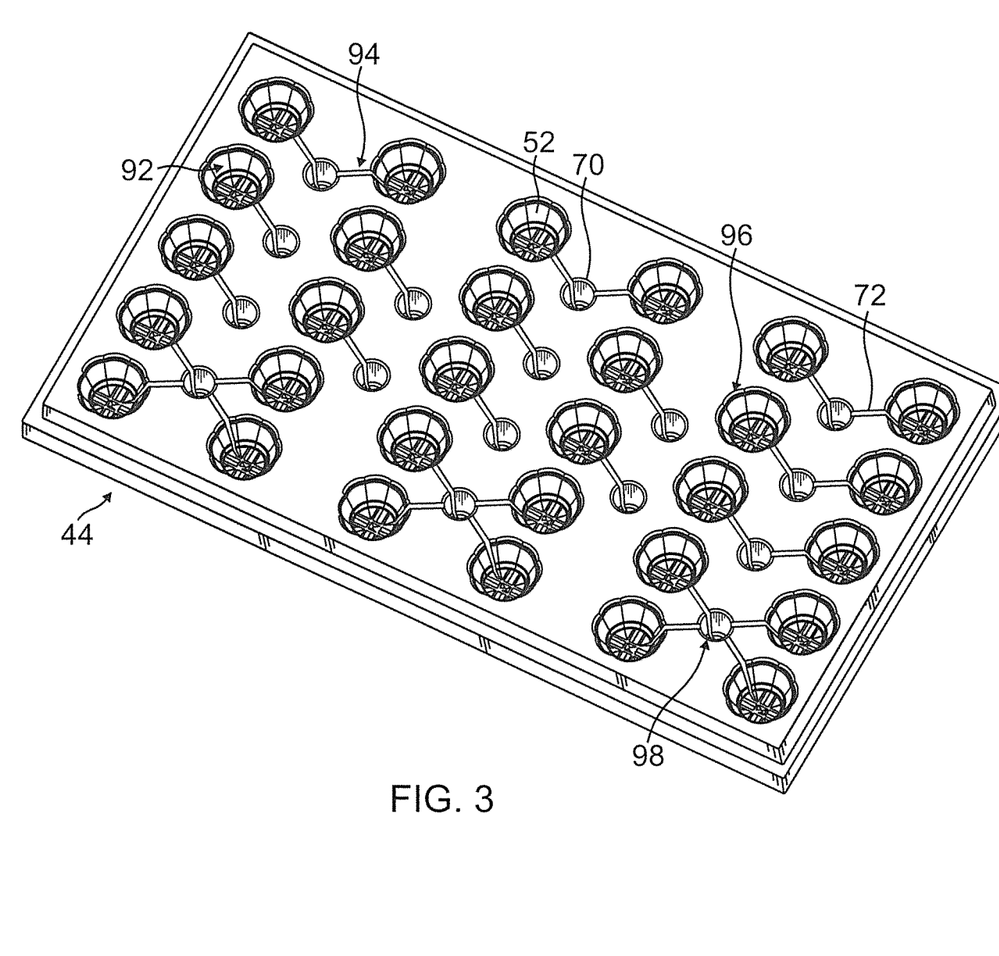
FIG. 3 is a perspective view of an alternative lens carrier for wet processing contact lenses.
Figure 3A:
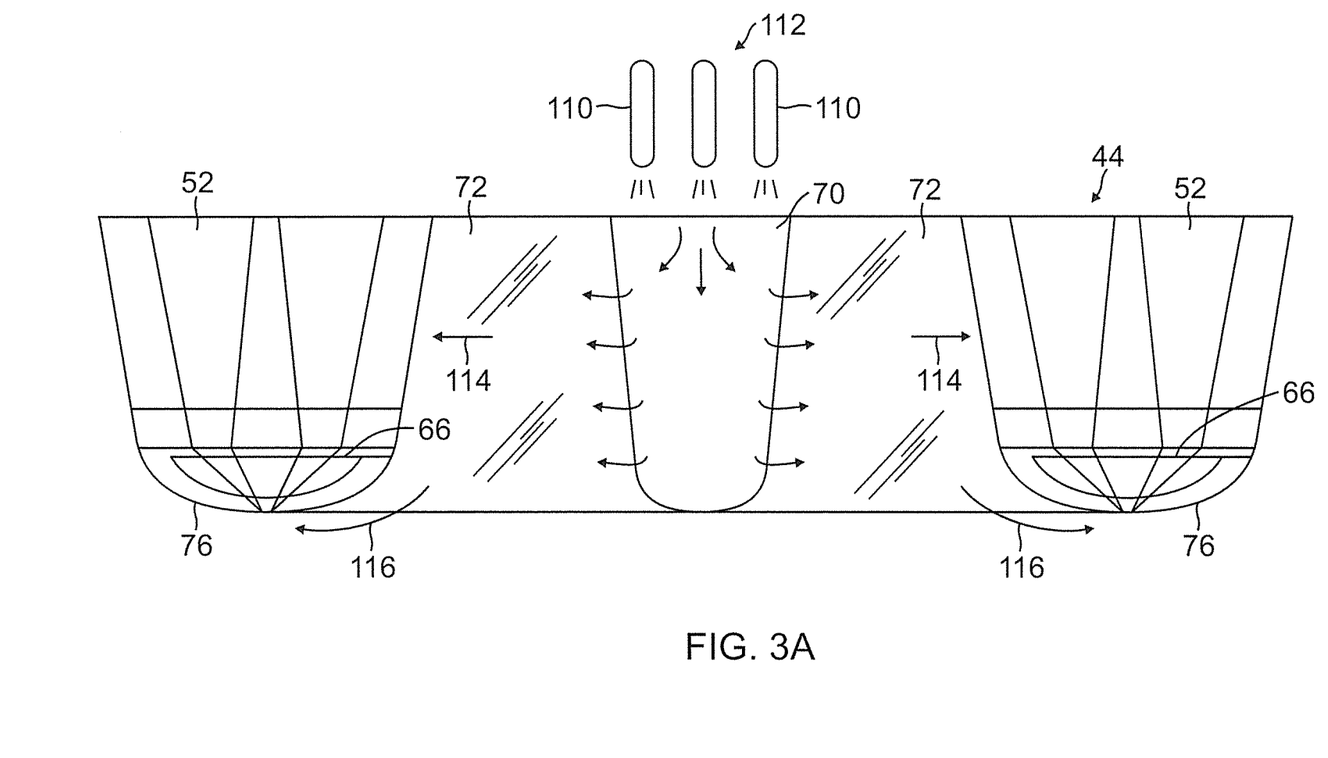
FIG. 3A is a schematic side view of the carrier of FIG. 3 taken along line 3A-3A in operation.

The cavity can be configured to position the lens body centrally within the well, thereby facilitating robotic or automated pick-up of the lens after the washing step(s). One example of a cavity configuration that achieves this function is illustrated in FIGS. 1, 1A, 2, 3, and 3A. With reference to FIG. 1 and FIG. 2, a cavity 52 is depicted in which an opening 56 is defined by a perimeter having a 8-leaf clover configuration. Optionally, other multi-leaf clover configurations (e.g. 4-, 5-, 6-, 7-, 9- and 10-leaf) can be used. With reference to FIG. 1A and FIG. 2, the cavity 52 tapers radially inwardly as it extends toward the cavity base surface 58. Thus, the interior surface 60 of the cavity 52 is both undulating and tapering. Internally, a cylindrical interior lower section is formed by a generally square or perpendicular, i.e. non-tapered, wall 62 relative to the cavity base, which is disposed below the tapered section 60 of the cavity interior lower section 62. Thus, when a lens body 66 (see also FIG. 3A) is placed in one of the cavities 52, the interior contour of the cavity is structured to align the lens so that it sits centrally inside the cavity with the base curve of the lens body facing the opening of the cavity. When lens body 66 is placed in one of the cavities 52, it rests on the bottom of the cavity and is self-aligned by the structure of the interior wall surfaces 60 and 62. As shown in FIGS. 2 and 3A, the periphery 68 of the lens body 66 fits against the perimeter of the square wall section 62, near the transition with the bottom base 58. In one example, the diameter of the square wall section is about 16 mm and the diameter of the lens body is about 14.0 mm to about 15.0 mm. In another example, the diameter of the square wall section is about 0.1 mm to about 0.3 mm larger than the diameter of the lens body to facilitate alignment to within a small tolerance. In this illustrated embodiment, the lens body may be understood to be a lens body of a contact lens. This specific cavity configuration is described in further detail in U.S. application Ser. No. 12/558,424, filed Sep. 11, 2009, the contents of which are expressly incorporated herein by reference for all purposes.

The lens carrier further comprises at least one reservoir 70 depending from the substantially planar upper surface; the at least one reservoir is fluidly connected to at least one cavity by way of one or more flow ducts. A single reservoir may be fluidly connected to a plurality of cavities by way of a corresponding plurality of flow ducts. Referring again to FIG. 1, the reservoir 70 may have a generally cylindrical shape or any other appropriate shape that defines a volume for holding a washing fluid. For example, the reservoir may be tapered and therefore not a true cylindrical shape. Each reservoir 70 is connected to one or more cavities 52, by way of one or more corresponding flow ducts 72. Thus, each reservoir 70 is said to be in fluid communication with one or more cavities 52. As shown in FIG. 1, each cavity 52 connects to one or two reservoirs 70, and each reservoir 70 connects to four cavities 52, though other configurations can be used. For example, referring to FIG. 3, an alternative lens carrier 44 is shown comprising a 5×6 array of cavities 52 for accommodating up to thirty lens bodies, wherein each lens body can be placed individually in each cavity. As shown, a single reservoir 70 can connect to a single cavity 52 via one flow duct 72, to two cavities 52 via two flow ducts 72, to three cavities 52 via three flow ducts 72, or to four cavities 52 via four flow ducts 72. By name, the grouping of cavities to reservoirs may be referred to as a single cavity group 92, a double cavity group 94, a triple cavity group 96, and a quadruple cavity group 98. Conceivably, a reservoir 70 may be connected to more than four cavities 52, such as to five or six cavities. Furthermore, while the carrier 90 is shown having a mixed group of cavity/reservoir combinations, the carrier may be formed uniformly as a single cavity group 92 and a different carrier may be formed as a double cavity group 94, etc. Thus, it is understood that a reservoir may be connected to one cavity or up to five, six, or more cavities and a carrier may have similar combinations of cavities and reservoirs as shown in FIG. 1 or a mixed group of cavities and reservoirs as shown in FIG. 3. FIGS. 1 and 3 depict reservoirs having less volume than that of the cavities. However, lens carriers with reservoirs having volumes substantially the same as or more than the cavities are also contemplated. In another example of a lens carrier, which is not depicted, each cavity is connected to two reservoir and flow duct pairs, and each reservoir is connected to a single cavity.

The flow ducts 72 may undulate or wind or may be straight. As shown in FIGS. 1, 2 and 3, the flow ducts are generally straight between a reservoir and a cavity. In one example, with reference to FIG. 1A, the flow duct 72 is formed through one of the leaf sections 74 of the eight-leaf clover-shaped cavity 52 and extends from the opening 56 of the cavity 52 and runs continuously to the cavity base surface 58. Similarly, the flow duct 72 extends from the opening of the reservoir (not shown) and runs continuously to the reservoir base surface (not shown). In one example, the base surface of the reservoir 70 is lower in elevation than the cavity base surface 58 so that the base surface of the flow duct 72 that connects the cavity and the reservoir 52 tapers from the cavity to the reservoir. In another example, the elevation of the reservoir base surface and the cavity base surface are the same or is lower for the cavity base surface. Thus the flow duct is in the form of an open groove or channel, which is entirely visible from a top view of the lens carrier 44. The flow duct 72 may have a rectangular cross section or a tapered cross-section, which is shown. In other examples, the flow duct may be in the form of a tube that lies beneath the upper planar surface of the lens carrier, which is not visible from a top view of the lens carrier. In such an example, the flow duct has two openings, one in the sidewall of the cavity and the other in the side wall of the reservoir. The dimensions of the flow duct can vary depending on the rate of flow of washing fluid that is desired.

The cavity of the lens carrier may optionally comprise at least one sub-base channel in fluid communication with the flow duct. The base channel is configured to allow washing fluid to flow underneath the base surface upon which the lens body rests. In a specific example, with reference to FIG. 2, a network of sub-cavity base channels 76, which resemble trenches, are located subjacent the cavity base surface 58. The base channels in each cavity 52 are in fluid communication with one another and with the flow ducts 72. As shown in FIG. 2, the base channels 76 are formed with two pairs of parallel channels 78, 80 that are orthogonal to one another. At least one diagonal channel 82 is also incorporated that directly extends into a flow duct 72. In another example, additional base channels 76 are incorporated to provide greater sub-floor fluid flow capacity. In yet other examples, fewer base channels are incorporated than as shown. Thus, as a posterior lens surface of a lens body located within a cavity faces the opening of the cavity and the anterior lens surface (i.e. front curve) faces the base surface 58 of the cavity, the flow duct or ducts 72 and network of base channels 76 allow fluids to flow below the lens and on the side of the lens within the cavity when filling or draining fluid from the cavity. The disclosed lens carrier thus provides a side flow and a sub-base surface flow to expose both the posterior and anterior lens surfaces of a lens body 66 (FIG. 3A) to washing fluid.

In a method of using the lens carrier in the manufacture of an ophthalmic lens, a washing fluid is added to the reservoir and allowed to flow across a flow duct and into a cavity. Referring to FIG. 3A, which shows a partial schematic cross-sectional side view of a lens earner 44, fluid added to the reservoir 70 flows through the flow duct 72 and enters the side 114 of the cavity 52 and hence along the side of a lens body 66 and the bottom 116 of the lens body through a network of base channels 76. For a carrier that incorporates different cavity groups as depicted in FIG. 3, such as a single cavity group 92, a double cavity group 94, etc., fluid additions to a cavity at a fixed flow rate can take longer to fill than a cavity having smaller ratios of cavities to reservoirs. For example, if a double cavity group takes 30 seconds to fill at a first fill rate, a single cavity group may take less to fill when filling at the same fill rate, such as 20 seconds or less to fill, due to the smaller combined volume in the single cavity group. Fluids may be added using a single nozzle 110 and using upstream valves to change the type of fluids that flow out the nozzle 110 or a series of nozzles 112 each having a dedicated fluid type. Still in another example, all or some of the individual nozzles 110 can process fluid of the same type to increase the overall flow rate to the reservoirs and use upstream valves to change the fluid type. For example, deionized water may flow out of all the nozzles and then through valving changes, a surfactant solution may flow out of all the nozzles.

An amount of washing fluid is delivered to the reservoir that achieves a desired level of washing fluid in the connected cavity(-ies). The washing fluid may be removed from the cavity after contact with the lens for only a few seconds (e.g., less than 10 seconds). Alternatively, the lens body may be allowed, to soak in the washing fluid for a period of time, such as for at least 30 seconds, 1-5 minutes, 5-10 minutes, 10-15 minutes, 15-20 minutes, 20-30 minutes, 30-60 minutes, or for more than one hour. The washing fluid is typically removed, from the cavity by suctioning fluid out of the reservoir, although suction can, additionally or alternatively, be applied to the cavity to remove all or some of the washing fluid. In lens carriers where a single cavity is connected to first and second reservoir and flow duct pairs, washing fluid can be delivered to the first, reservoir and flowed through the first flow duct into the cavity, and removed from the cavity via the second flow duct by suctioning fluid out of the second reservoir. In such an example, the washing step may comprise simultaneous deliver of the washing fluid to the first reservoir and suction of the washing fluid from the second reservoir, with the simultaneous delivery and suction continuing as long as needed to achieve the desired washing effect.

Addition and/or removal of fluid via the reservoir allows the washing step to be carried out without having to place a delivery needle, nozzle, or other filling or draining means, in or above the cavity, thereby minimizing the possibility of accidently contacting a lens body located within the cavity with the washing apparatus. Fluid addition via the flow ducts and reservoirs also reduces the possibility that addition of the washing fluid will press the lens body against the cavity base surface, and possibly deform it, as fluids flows from the outside of the periphery of the lens body and, when base channels are employed, from below the lens body. Also, by having one or more reservoirs fluidly connected to the cavity, a greater volume of liquid is available in which a lens can soak compared to a stand-alone cavity of the same dimension. This can lead to more effective washing and may allow a reduction in the number of washing cycles or duration, which is useful in the manufacture of silicone hydrogel contact lenses, especially in manufacturing processes in which the washing fluid comprises an aqueous solution without a volatile alcohol, and wherein the ophthalmic lens does not contact a volatile alcohol during the manufacturing.

In specific examples, the lens carriers are stackable. For example, FIG. 1 depicts a stackable configuration wherein the carrier 44 comprises an outer perimeter edge 84, a recessed perimeter edge 86, and a ledge 88 located therebetween. The carriers 44 can form a stack of carriers (not shown) by placing the outer perimeter edge 84 of one carrier on top of the ledge 88 of another carrier and so forth.

Figure 4:
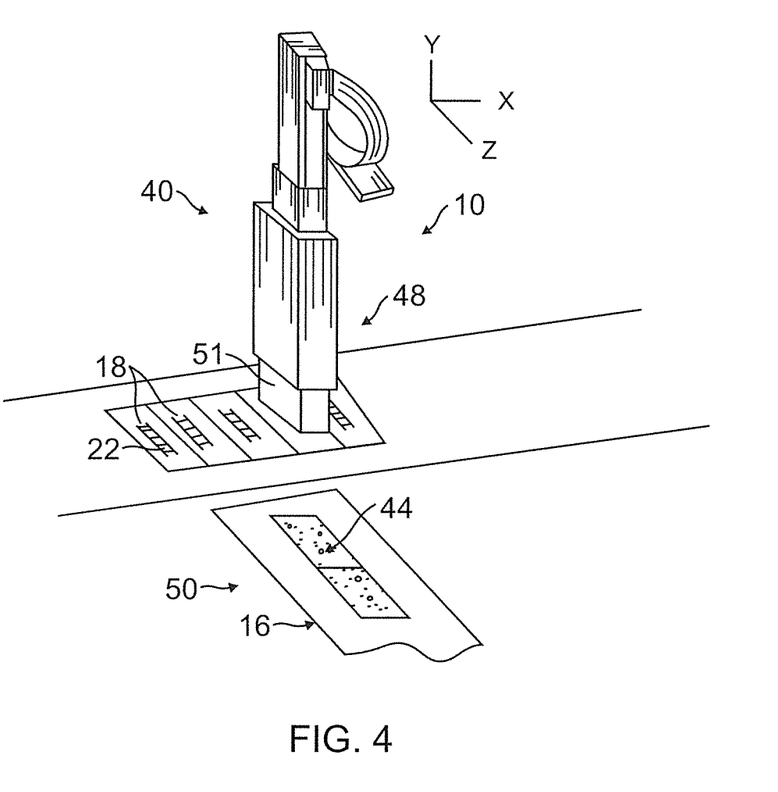
FIG. 4 is a schematic view of an exemplary ophthalmic lens transfer and packaging system.

In a specific example, the lens carrier is used in the systems and methods of manufacture described in U.S. patent application Ser. No. 12/558,424, entitled Methods, Devices and Systems for Moving Wet Ophthalmic Lenses During Their Manufacture, filed Sep. 11, 2009, previously incorporated herein by reference. Briefly, FIG. 4 depicts an exemplary system 10 which includes a lens carrier 44 comprising the above described cavities, reservoirs, and fluid ducts (not depicted) and a "pick and place" robot 40. The pick and place robot 40 is programmed to traverse along the z axis to move between a first working area 48 and a second working area 50. The first working area covers a general area that is above one or more infeed trays 18 and the second working area covers a general area that is above one or more lens carriers 44. Thus, the pick and place robot 40 is configured to move from between the second working area 50 to pick up a set of ophthalmic lenses and the first working area 48 to place the ophthalmic lenses in corresponding blister packs 22. Movement along the y axis enables the pick and place robot 40 to raise and lower its end effector 51 when located at the first working area or the second working area. In a specific example, the robot applies a vacuum to the end effector 51 to pick up a plurality of ophthalmic lenses or deactivate the vacuum to drop the ophthalmic lenses into corresponding blister packs. For example, the pick and place robot 40 may be equipped with pick up heads (not shown) that can pick up five individual ophthalmic lenses at a time or ten individual ophthalmic lenses at a time and place them into a corresponding number of blister packs. The number of ophthalmic lenses that may be picked up at any one time can vary depending on, among other things, the configuration of the carriers and the infeed trays.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

What is claimed is:

1. A method of manufacturing an ophthalmic lens, comprising:
   (a) providing a lens carrier comprising:
      (i) a substantially planar upper surface;
      (ii) a cavity depending from the substantially planar upper surface, wherein the cavity has a perimeter defining an opening, a sidewall portion, and a base surface in contact with the sidewall portion, wherein the cavity is sized to accommodate a lens body and a volume of washing fluid;
      (iii) a reservoir depending from the substantially planar upper surface; and
      (iv) a flow duct fluidly connecting the reservoir to the cavity, wherein the flow duct is in the form of an open groove that extends from the opening of the cavity to the base surface of the cavity;
   (b) placing a lens body in the cavity of the lens carrier;
   (c) delivering a washing fluid to the reservoir, wherein the washing fluid flows through the flow duct and into the cavity and contacts the lens body to provide a washed lens.

2. The method of claim 1, wherein the washing fluid is selected from the group consisting of water, an organic solvent, a volatile alcohol, an aqueous saline solution, an aqueous buffer solution, a surfactant solution, a wetting agent solution, and combinations thereof.

3. The method of claim 1, further comprising predosing the cavity with the washing fluid prior to placing the lens body in the cavity.

4. The method of claim 1, wherein the lens carrier is formed from a thermoplastic material.

5. The method of claim 1, wherein the base surface of the cavity has a semi-spherical shape, and wherein the lens body is retained with its base curve facing the opening of the cavity.

6. The method of claim 1, wherein the reservoir is fluidly connected to a plurality of cavities, each cavity depending from the substantially planar upper surface, wherein each cavity has a perimeter defining an opening, a sidewall portion, and a base surface in contact with the sidewall portion, wherein each cavity is sized to accommodate a lens body and a volume of washing fluid.

7. The method of claim 1, wherein the reservoir is fluidly connected to four cavities.

8. The method of claim 1, wherein the cavity comprises at least one sub-base channel in fluid communication with the flow duct.

9. The method of claim 1, wherein the ophthalmic lens is a silicone hydrogel contact lens.

10. The method of claim 1, wherein the ophthalmic lens does not contact a volatile alcohol during the manufacturing.

11. The method of claim 1, wherein the lens body comprises a silicone hydrogel that has not been exposed to a liquid prior to washing, and the washing fluid comprises an aqueous solution without a volatile alcohol.

* * * * *

UNITED STATES PATENT AND TRADEMARK OFFICE
CERTIFICATE OF CORRECTION

PATENT NO. : 8,668,780 B2
APPLICATION NO. : 12/957605
DATED : March 11, 2014
INVENTOR(S) : Stephen English et al.

Page 1 of 1

It is certified that error appears in the above-identified patent and that said Letters Patent is hereby corrected as shown below:

In the Specification:

In column 1, line 49, delete "An example," and insert -- For example, --, therefor.

In column 3, line 17, delete "devices and" and insert -- devices, and --, therefor.

In column 5, line 29, delete "a 8-leaf" and insert -- an 8-leaf --, therefor.

In column 5, line 38, delete "cavity interior" and insert -- cavity. A semi-spherical shaped base surface 58 of the cavity is disposed adjacent the generally cylindrical interior --, therefor.

In column 7, line 24, delete "earner 44," and insert -- carrier 44, --, therefor.

In column 7, line 51, delete "allowed, to" and insert -- allowed to --, therefor.

In column 7, lines 54-55, delete "removed," and insert -- removed --, therefor.

In column 7, line 60, delete "first, reservoir" and insert -- first reservoir --, therefor.

In column 7, line 64, delete "deliver of" and insert -- delivery of --, therefor.

Signed and Sealed this
Sixteenth Day of September, 2014

Michelle K. Lee
*Deputy Director of the United States Patent and Trademark Office*